US012473023B2

United States Patent
(12) United States Patent
Sugawara et al.

(10) Patent No.: US 12,473,023 B2
(45) Date of Patent: Nov. 18, 2025

(54) VEHICLE CONTROL APPARATUS, VEHICLE CONTROL METHOD, AND VEHICLE CONTROL SYSTEM

(71) Applicant: Hitachi Astemo, Ltd., Hitachinaka (JP)

(72) Inventors: Hiroki Sugawara, Hitachinaka (JP); Kentaro Ueno, Hitachinaka (JP)

(73) Assignee: Hitachi Astemo, Ltd., Hitachinaka (JP)

(*) Notice: Subject to any disclaimer, the term of this patent is extended or adjusted under 35 U.S.C. 154(b) by 123 days.

(21) Appl. No.: 18/281,242

(22) PCT Filed: Dec. 28, 2021

(86) PCT No.: PCT/JP2021/048878
§ 371 (c)(1),
(2) Date: Sep. 8, 2023

(87) PCT Pub. No.: WO2022/190585
PCT Pub. Date: Sep. 15, 2022

(65) Prior Publication Data
US 2024/0158009 A1 May 16, 2024

(30) Foreign Application Priority Data
Mar. 11, 2021 (JP) ................................ 2021-038825

(51) Int. Cl.
*B62D 6/04* (2006.01)
*B60W 30/10* (2006.01)
*H04W 4/46* (2018.01)

(52) U.S. Cl.
CPC ............... *B62D 6/04* (2013.01); *B60W 30/10* (2013.01); *H04W 4/46* (2018.02)

(58) Field of Classification Search
CPC ......... B62D 6/04; B62D 6/003; B60W 30/10; B60W 2520/10; B60W 2520/14; B60W 2520/18; B60W 2555/20; B60W 2556/50; B60W 2556/65; B60W 2720/125; H04W 4/46
See application file for complete search history.

(56) References Cited

U.S. PATENT DOCUMENTS 11,753,007 B2 * 9/2023 Van Dan Elzen .... B60W 30/12 701/41
11,820,370 B2 * 11/2023 Strecker ................ B60W 40/10
(Continued)

FOREIGN PATENT DOCUMENTS

DE 10 2014 208 786 A1 11/2015
DE 102016115339 A1 * 3/2017 ............ B60W 10/20
(Continued)

OTHER PUBLICATIONS

Machine Translation of DE 102016115339 A1 PDF File Name: "DE102016115339A1_Machine_Translation.pdf" (Year: 2017).*
(Continued)

*Primary Examiner* — Lindsay M Low
*Assistant Examiner* — Ruben Picon-Feliciano
(74) *Attorney, Agent, or Firm* — Crowell & Moring LLP

(57) ABSTRACT

A vehicle control apparatus, a vehicle control method, and a vehicle control system according to the present invention each acquire information related to a positional difference in a transverse direction between a target trajectory of a vehicle and an actual trajectory of the vehicle, estimate an amount of disturbance corresponding to the positional difference in the transverse direction by using the information related to the positional difference in the transverse direction, and obtain a control command by using the amount of disturbance as an aspect thereof. The control command is for causing the vehicle to track the target trajectory. This makes it possible to accurately estimate the amount of disturbance and increase the performance of tracking the target trajectory.

8 Claims, 6 Drawing Sheets

300
10
100
500A
310 STEREO CAMERA
320 MAP/GPS
330 COMMUNICATION
340 RADAR
350 OMNIDIRECTIONAL CAMERA
400
500
TRAJECTORY GENERATION SECTION
VEHICLE MODEL 510
501
520 VEHICLE CONTROL
530 LOOKAHEAD COMPENSATION
570 ACTUATOR CONTROL SECTION
600 STEERING
601 MOTOR
C/U
11L
VEHICLE INFORMATION
560 CONTROL AMOUNT CORRECTION VALUE CREATION SECTION
210 WHEEL SPEED/ VEHICLE SPEED
220 YAW RATE
230 LATERAL G
240 STEERING ANGLE
400A
410
540
TRANSVERSE DEVIATION
SLOPE CORRECTION VALUE CREATION SECTION
550 SLOPE CORRECTION SECTION
590 SLOPE ESTIMATION SECTION
602
11R
200

(56) References Cited

U.S. PATENT DOCUMENTS

| | | | | |
|---|---|---|---|---|
| 2008/0243329 | A1* | 10/2008 | Hamel | B62D 5/0472 701/31.4 |
| 2012/0109411 | A1* | 5/2012 | Tokimasa | B60W 10/184 701/1 |
| 2013/0190983 | A1* | 7/2013 | Tatsukawa | B62D 6/003 701/41 |
| 2016/0075334 | A1 | 3/2016 | Terazawa | |
| 2017/0057544 | A1 | 3/2017 | Matsuno et al. | |
| 2019/0299998 | A1 | 10/2019 | Sakurada | |

FOREIGN PATENT DOCUMENTS

| | | |
|---|---|---|
| JP | 2017-47798 A | 3/2017 |
| JP | 2019-172220 A | 10/2019 |

OTHER PUBLICATIONS

Extended European Search Report issued in European Application No. 21930429.2 dated Jul. 11, 2024 (8 pages).

International Search Report (PCT/ISA/210) issued in PCT Application No. PCT/JP2021/048878 dated Feb. 8, 2022 with English translation (4 pages).

Japanese-language Written Opinion (PCT/ISA/237) issued in PCT Application No. PCT/JP2021/048878 dated Feb. 8, 2022 with English translation (7 pages).

International Preliminary Report on Patentability (PCT/IB/338 & PCT/IB/373) issued in PCT Application No. PCT/JP2021/048878 dated Sep. 1, 2023, including English translation of document C2 (Japanese-language Written Opinion (PCT/ISA/237) filed on Sep. 8, 20223) (13 pages).

* cited by examiner

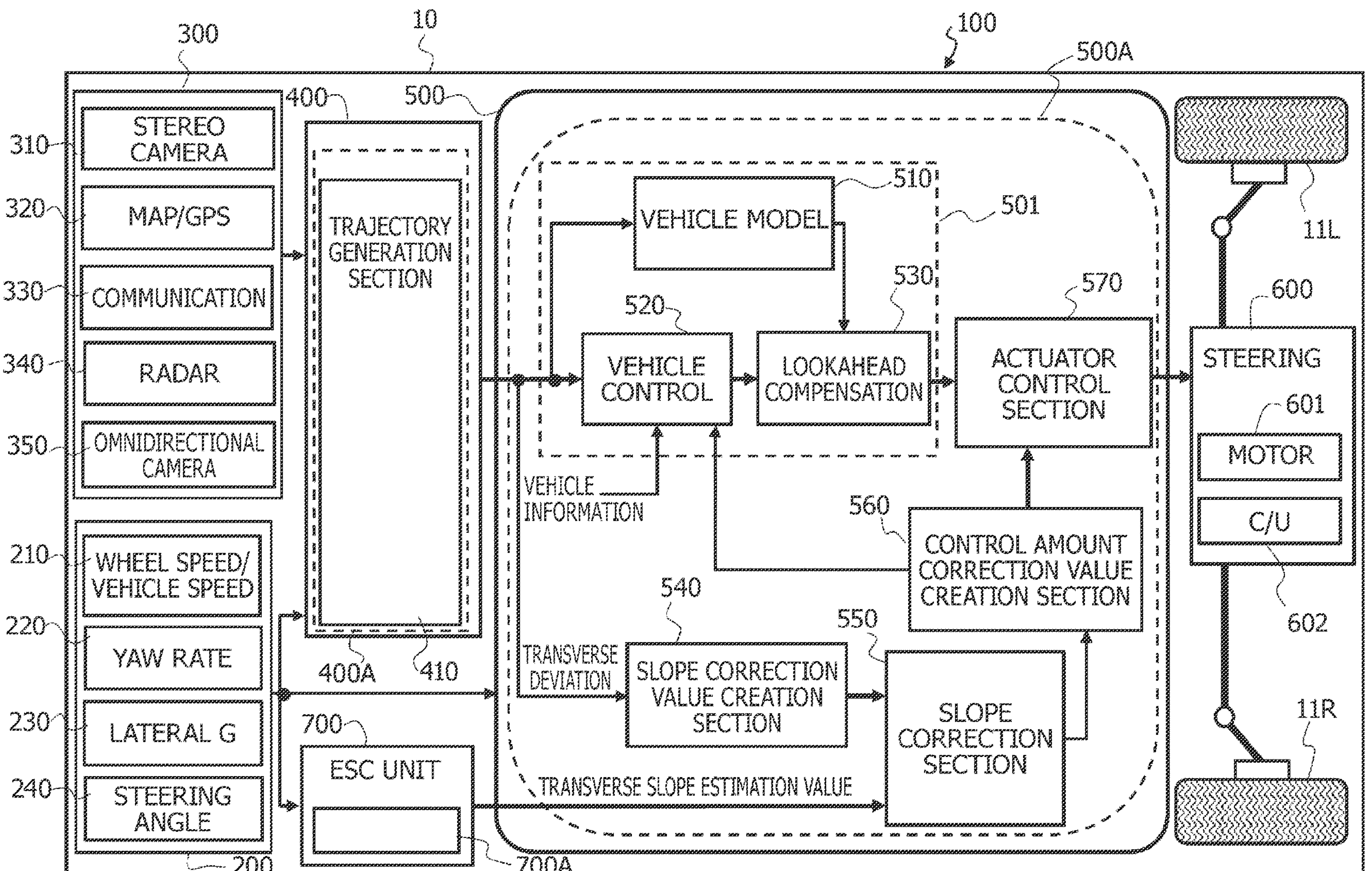
FIG.1
300
10
100
500A
400
500
310
STEREO CAMERA
320
MAP/GPS
330
COMMUNICATION
340
RADAR
350
OMNIDIRECTIONAL CAMERA
TRAJECTORY GENERATION SECTION
510
VEHICLE MODEL
501
530
520
VEHICLE CONTROL
LOOKAHEAD COMPENSATION
570
ACTUATOR CONTROL SECTION
600
STEERING
601
MOTOR
C/U
602
11L
11R
VEHICLE INFORMATION
560
CONTROL AMOUNT CORRECTION VALUE CREATION SECTION
210
WHEEL SPEED/ VEHICLE SPEED
220
YAW RATE
230
LATERAL G
240
STEERING ANGLE
200
400A
410
540
550
TRANSVERSE DEVIATION
SLOPE CORRECTION VALUE CREATION SECTION
SLOPE CORRECTION SECTION
700
ESC UNIT
700A
TRANSVERSE SLOPE ESTIMATION VALUE

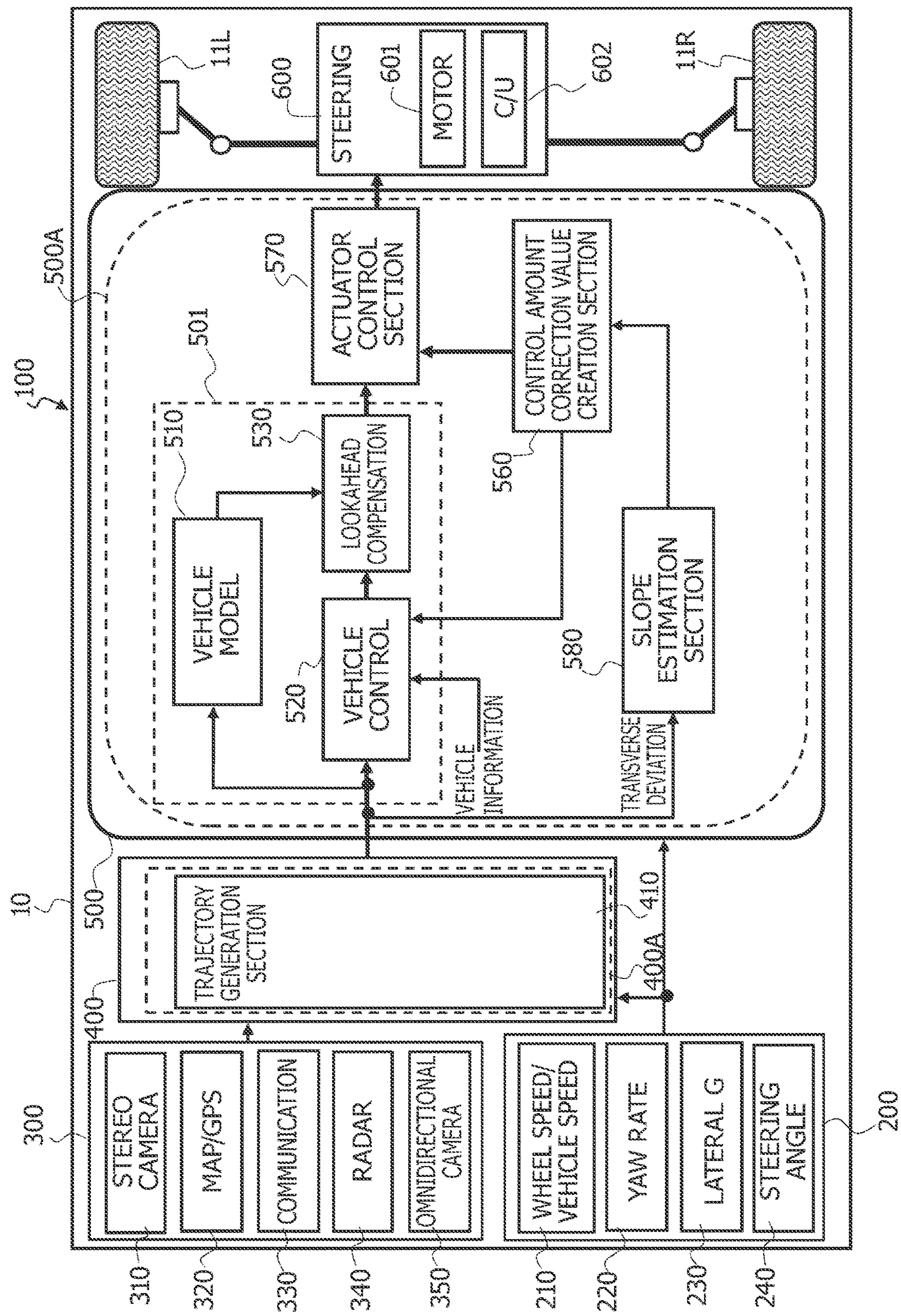
FIG.8
100
10
STEERING
600
601
MOTOR
C/U
602
11L
11R
500A
570
ACTUATOR CONTROL SECTION
501
CONTROL AMOUNT CORRECTION VALUE CREATION SECTION
560
510
530
VEHICLE MODEL
LOOKAHEAD COMPENSATION
VEHICLE CONTROL
520
580
SLOPE ESTIMATION SECTION
VEHICLE INFORMATION
TRANSVERSE DEVIATION
500
400
TRAJECTORY GENERATION SECTION
410
400A
300
STEREO CAMERA
MAP/GPS
COMMUNICATION
RADAR
OMNIDIRECTIONAL CAMERA
310
320
330
340
350
200
WHEEL SPEED/VEHICLE SPEED
YAW RATE
LATERAL G
STEERING ANGLE
210
220
230
240

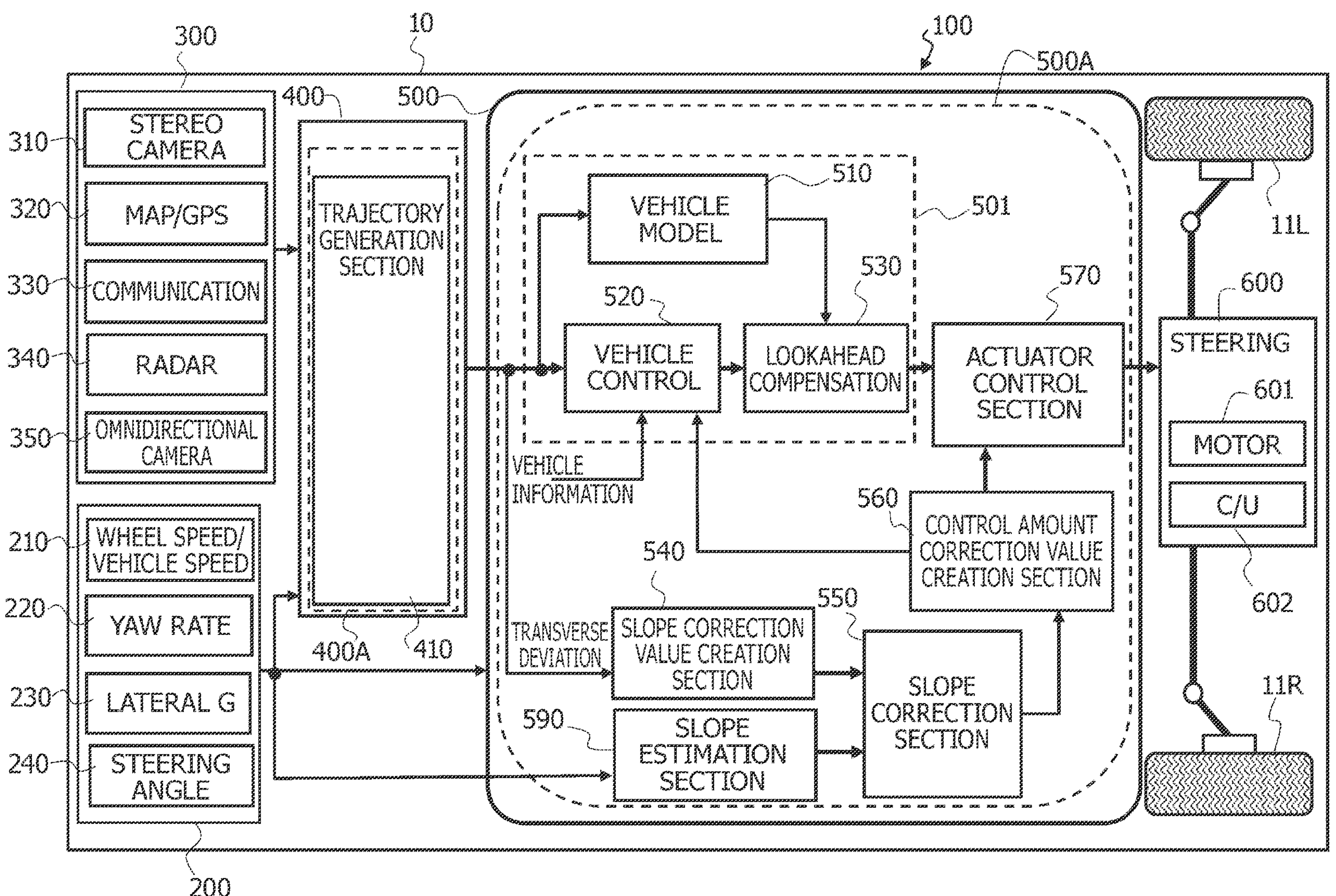
FIG.9
100
10
300
STEREO CAMERA
MAP/GPS
COMMUNICATION
RADAR
OMNIDIRECTIONAL CAMERA
310
320
330
340
350
WHEEL SPEED/ VEHICLE SPEED
YAW RATE
LATERAL G
STEERING ANGLE
200
210
220
230
240
TRAJECTORY GENERATION SECTION
400
400A
410
500
500A
501
VEHICLE MODEL
510
VEHICLE CONTROL
520
LOOKAHEAD COMPENSATION
530
VEHICLE INFORMATION
ACTUATOR CONTROL SECTION
570
CONTROL AMOUNT CORRECTION VALUE CREATION SECTION
560
TRANSVERSE DEVIATION
SLOPE CORRECTION VALUE CREATION SECTION
540
SLOPE ESTIMATION SECTION
590
SLOPE CORRECTION SECTION
550
STEERING
600
MOTOR
601
C/U
602
11L
11R

VEHICLE CONTROL APPARATUS, VEHICLE CONTROL METHOD, AND VEHICLE CONTROL SYSTEM

TECHNICAL FIELD

The present invention relates to a vehicle control apparatus, to a vehicle control method, and to a vehicle control system.

BACKGROUND ART

Patent Document 1 discloses a cant estimating method of estimating the cant of a road on which a vehicle is traveling.

This cant estimating method includes a step of acquiring vehicle information including pieces of information related to the speeds, the lateral accelerations, the steering angles, the yaw rates, and the positions of a plurality of vehicles including a first vehicle, a step of estimating the cant of a road on which the first vehicle is traveling on the basis of the vehicle information, and a step of storing the estimated cant in a cant angle database in association with information related to the position of the first vehicle, and the cant angle database being usable by a plurality of vehicles.

REFERENCE DOCUMENT LIST

Patent Document

Patent Document 1: JP 2019-172220 A

SUMMARY OF THE INVENTION

Problem to be Solved by the Invention

For example, when a vehicle travels on a road with a transverse slope (i.e., cross slope) in autonomous driving that causes the actual trajectory of the vehicle to track a target trajectory, gravity causes the actual trajectory to deviate to the lower side of the slope, and the performance of tracking the actual trajectory with respect to the target trajectory decreases in some cases.

In addition, a crosswind can also apply, to the vehicle, external force that deflects the vehicle to deviate the actual trajectory from the target trajectory. Furthermore, vehicle characteristics, such as alignment, involved in the deflection of a vehicle can also deviate the actual trajectory from the target trajectory.

Here, to prevent disturbance such as the transverse slope of a road or a crosswind from decreasing the performance of tracking the target trajectory, it is necessary to estimate the amount of disturbance with high accuracy and use a command corresponding to the amount of disturbance as a control command such as a steering control command.

It is, however, difficult to estimate the amount of disturbance with high accuracy in processing for estimating the amount of disturbance, for example, on the basis of information related to vehicle motion such as vehicle speed, lateral acceleration, or a yaw rate. Even if a vehicle control apparatus controls the vehicle on the basis of a result of the estimation of the amount of disturbance, it is not possible to sufficiently prevent the disturbance from causing the actual trajectory to deviate from the target track trajectory.

The present invention has been made in view of the conventional situation. An object of the present invention is to provide a vehicle control apparatus, a vehicle control method, and a vehicle control system capable of accurately estimating the amount of disturbance and increasing the performance for tracking a target trajectory.

Means for Solving the Problem

According to an aspect of the present invention, information related to a positional difference in a transverse direction between a target trajectory of a vehicle and an actual trajectory of the vehicle is acquired. An amount of disturbance corresponding to the positional difference in the transverse direction is estimated by using the information related to the positional difference in the transverse direction. A control command for causing the vehicle to track the target trajectory, is obtained by using the amount of disturbance.

Effects of the Invention

According to the present invention, it is possible to accurately estimate the amount of disturbance and increase the performance of tracking a target trajectory.

BRIEF DESCRIPTION OF THE DRAWINGS

FIG. 1 is a block diagram illustrating a first embodiment of a vehicle control system.

FIG. 8 is a block diagram illustrating a second embodiment of the vehicle control system.

FIG. 9 is a block diagram illustrating a third embodiment of a vehicle control system.

MODE FOR CARRYING OUT THE INVENTION

Figure 2:
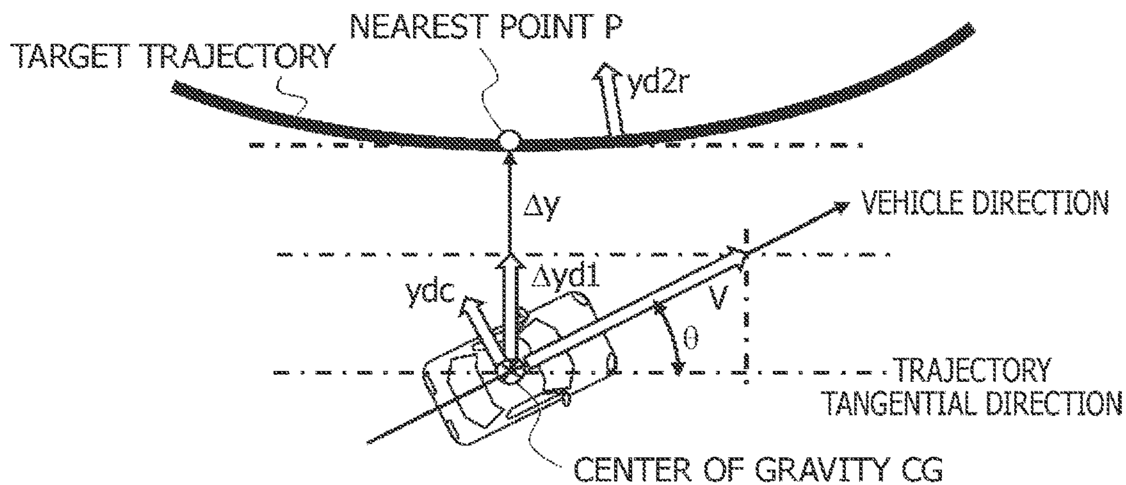
FIG. 2 is a diagram illustrating a variety of variables and an aspect of a coordinate system that are used to calculate a lateral acceleration command.

The following describes embodiments of a vehicle control apparatus, a vehicle control method, and a vehicle control system according to the present invention on the basis of the drawings.

FIG. 1 is a block diagram illustrating a first embodiment of a vehicle control system 100.

Vehicle control system 100 is mounted on a vehicle 10 such as a four-wheeled automobile.

Vehicle control system 100 then controls a steering angle by an electronic control power steering apparatus 600 to cause vehicle 10 to track a target trajectory (i.e., target path) in autonomous driving.

Vehicle control system 100 includes a vehicle state detection apparatus 200, an external environment recognition apparatus 300, an autonomous driving control apparatus 400, a vehicle motion control apparatus 500, electronic control power steering apparatus 600, and an ESC (Electric Stability Control) unit 700.

Autonomous driving control apparatus 400, vehicle motion control apparatus 500, and ESC unit 700 are electronic control apparatuses including microcomputers 400A, 500A, and 700A as main components. Microcomputers 400A, 500A, and 700A each make a calculation on the basis of input information, and output a result of the calculation.

Microcomputers 400A, 500A, and 700A each include an MPU (Microprocessor Unit), a ROM (Read Only Memory), a RAM (Random Access Memory), and the like.

Microcomputer 400A of autonomous driving control apparatus 400 has a function of a trajectory generation section 410 that calculates a target trajectory.

Trajectory generation section 410 acquires information related to the position of vehicle 10 (i.e., information related to the position of the own vehicle), information related to the driving state of the vehicle, and information related to a surrounding area by using vehicle state detection apparatus 200 and external environment recognition apparatus 300 and calculates a target trajectory on the basis of the respective pieces of acquired information.

Microcomputer 500A of vehicle motion control apparatus 500 then calculates a steering control command for causing vehicle 10 to track the target trajectory calculated by autonomous driving control apparatus 400 and outputs the calculated steering control command to electronic control power steering apparatus 600, the steering control command specifically being a steering angle control command or a steering torque control command. Electronic control power steering apparatus 600 is a steering apparatus that changes the traveling direction of vehicle 10 by changing the angles of front wheels 11L and 11R of vehicle 10.

Electronic control power steering apparatus 600 includes a steering actuator 601 such as a motor and a steering control unit 602. Steering actuator 601 changes the angles of front wheels 11L and 11R that are steered road wheels. Steering control unit 602 is an actuator control device that controls steering actuator 601.

Steering control unit 602 controls steering actuator 601 on the basis of a steering control command acquired from vehicle motion control apparatus 500 to achieve the steering angle or the steering torque corresponding to the steering control command.

In short, in vehicle control system 100, autonomous driving control apparatus 400 generates a target trajectory of vehicle 10, vehicle motion control apparatus 500 obtains a control command for causing vehicle 10 to track the target trajectory, and steering control unit 602 acquires the control command and controls steering actuator 601.

Vehicle state detection apparatus 200 includes a wheel speed/vehicle speed sensor 210, a yaw rate sensor 220, a lateral G sensor 230, and a steering angle sensor 240. Wheel speed/vehicle speed sensor 210 detects the wheel speed or the vehicle speed. Yaw rate sensor 220 detects the yaw rate of vehicle 10. Lateral G sensor 230 detects the lateral acceleration of vehicle 10. Steering angle sensor 240 detects the steering angles of front wheels 11L and 11R.

In addition, external environment recognition apparatus 300 includes a stereo camera 310, a navigation system 320, a vehicle-to-vehicle communication device 330, a radar 340, and an omnidirectional camera 350.

Stereo camera 310 detects and recognizes a target around vehicle 10 and obtains the distance to the target or the like.

In short, stereo camera 310 measures the parallax on the basis of the viewing disparity between the left and right cameras and calculates the distance to the target by using the principle of triangulation.

Navigation system 320 includes a GPS (Global Positioning System) receiver and a map database. Navigation system 320 acquires information related to the current position of vehicle 10, information related to a route to a destination, and the like.

The GPS receiver of navigation system 320 receives signals from a GPS satellite to measure the latitude and the longitude of the position of vehicle 10.

The map database of navigation system 320 is a database formed in a storage unit mounted on vehicle 10. Map information includes pieces of information related to a road position, a road shape, an intersection position, and the like.

Vehicle-to-vehicle communication device 330 acquires road traffic information, information related to the behavior of another vehicle, information related to the position of the other vehicle, and the like from the other vehicle through wireless communication between the vehicles.

Radar 340 detects an obstacle ahead of vehicle 10 and further measures the distance to the obstacle ahead and the speed of the obstacle ahead. Radar 340 outputs the measured distance and speed as pieces of information related to the obstacle ahead.

Omnidirectional camera 350 is a device that converts the viewpoints of images acquired from a plurality of cameras attached to the front, back, left, and right portions of vehicle 10 to offer an image or an overhead image in which the top of the own vehicle appears.

Autonomous driving control apparatus 400 recognizes a surrounding situation around the own vehicle on the basis of pieces of information related to the position of the own vehicle and an object around the own vehicle and the like and generates a target trajectory serving as a target of a traveling route of vehicle 10 on the basis of a result of the recognition. The pieces of information related to the position of the own vehicle and the object around the own vehicle are acquired from external environment recognition apparatus 300.

Here, autonomous driving control apparatus 400 acquires the information related to the position of vehicle 10 on the basis of positioning by the GPS, dead reckoning, a result of the recognition of the surrounding situation by stereo camera 310 or the like, and further information or the like acquired from another vehicle traveling nearby through vehicle-to-vehicle communication.

A method of acquiring the information related to the position of vehicle 10 by using positioning by dead reckoning and the result of the recognition of the surrounding situation by stereo camera 310 or the like is a method of acquiring the information related to the position of vehicle 10 on the basis of signals of the on-board sensors.

In dead reckoning, the position of vehicle 10 is estimated, for example, on the basis of the vehicle speed and the yaw angle of vehicle 10.

In addition, a method of acquiring the information related to the position of vehicle 10 on the basis of positioning by GPS, information acquired from another vehicle traveling nearby through vehicle-to-vehicle communication, and the like is a method of acquiring the information related to the position of vehicle 10 on the basis of signals received from the outside of vehicle 10.

In positioning by the GPS, the signals received from the outside of vehicle 10 include signals received from a GPS satellite, the signals specifically including time data, information related to the orbit of the satellite, and the like.

In addition, in positioning with vehicle-to-vehicle communication, the signals received from the outside of vehicle 10 include a signal received from another vehicle through vehicle-to-vehicle communication.

When detecting a skidding behavior of vehicle 10, ESC unit 700 performs control to keep the attitude of vehicle 10 stable by controlling the output of a driving apparatus of vehicle 10 and/or the brake pressures of the individual wheels in a braking apparatus of vehicle 10.

ESC unit 700 acquires pieces of information related to the vehicle speed, the lateral acceleration, the steering angle, the yaw rate, and the like of vehicle 10 from vehicle state detection apparatus 200 and monitors a driver's driving operation and the movement of vehicle 10 on the basis of the acquired vehicle information. ESC unit 700 then actuates a function for keeping the attitude of vehicle 10 stable on the basis of the driver's driving operation and the movement of vehicle 10.

In addition, ESC unit 700 estimates the transverse slope of a road on which vehicle 10 travels on the basis of the acquired vehicle information. ESC unit 700 outputs information related to the estimated transverse slope to vehicle motion control apparatus 500.

Vehicle motion control apparatus 500 includes a vehicle model 510, a control section 520, a lookahead compensation section 530, a slope correction value creation section 540, a slope correction section 550, a control amount correction value creation section 560, and an actuator control section 570.

Here, vehicle model 510, control section 520, and lookahead compensation section 530 are included in a tracking controller 501 that obtains a control command for causing vehicle 10 to track a target trajectory.

Tracking controller 501 calculates a lateral acceleration command by using model predictive control. The lateral acceleration command is a control command for causing vehicle 10 to track a target trajectory generated by autonomous driving control apparatus 400.

The model predictive control is a known control method in which a future behavior is predicted by using a model that is a control target, and it is determined how much the control target is operated while solving the optimization problem at each time.

In the model predictive control in vehicle motion control apparatus 500 (specifically, tracking controller 501), a response in a predetermined prediction time (e.g., in 500 ms) is predicted by using vehicle model 510 to search for a lateral acceleration command yd2c (i.e., a target value of the lateral acceleration) for decreasing a tracking error in the prediction section.

The use of this model predictive control makes it possible to prevent a response delay of steering actuator 601 of electronic control power steering apparatus 600 or the like from decreasing the performance of vehicle 10 tracking a target trajectory. In addition, it is possible to achieve natural trajectory control by feedforward control.

Vehicle motion control apparatus 500 acquires the positional difference (which will be referred to as "transverse deviation" below) in the transverse direction between vehicle 10 (i.e., the actual trajectory of vehicle 10) and a target trajectory, the orientation of vehicle 10 (i.e., the traveling direction of vehicle 10 with respect to the target trajectory), and information related to the curvature of the target trajectory. The transverse deviation is the distance between vehicle 10 and the target trajectory.

Vehicle motion control apparatus 500 then calculates lateral acceleration command yd2c on the basis of the transverse deviation (i.e., lateral position deviation), the orientation of vehicle 10, and the curvature of the target trajectory to decrease the transverse deviation.

In short, vehicle motion control apparatus 500 has a function of a transverse direction difference acquisition section that acquires information related to the difference in the transverse direction between the target trajectory of vehicle 10 and the actual trajectory of vehicle 10.

FIG. 2 is a diagram illustrating a variety of variables and an aspect of a coordinate system that are used to calculate lateral acceleration command yd2c.

It is to be noted that a nearest point P in FIG. 2 is the point that is the nearest to the position of vehicle 10 on a target trajectory, specifically a center of gravity CG of vehicle 10.

In addition, the trajectory tangential direction in FIG. 2 is a virtual line that is parallel to the tangential direction of the target trajectory at nearest point P and passes through center of gravity CG of vehicle 10.

A coordinate system is then used in which center of gravity CG of vehicle 10 serves as an origin, the trajectory tangential direction serves as an x axis, and the direction from center of gravity CG to nearest point P serves as a y axis.

Equation 1 is a formula for calculating lateral acceleration command yd2c.

$$yd2c = G1\cdot\Delta y - G2\cdot\Delta yd1 + G3\cdot yd2r = G1\cdot\Delta y - G2\cdot V\sin\theta + G3\cdot\frac{1}{R}V^2 \quad \text{Equation 1}$$

In Equation 1, G1, G2, G3 denote gains given as constants. R denotes the curvature of a target trajectory. V denotes vehicle speed. Δy denotes the transverse deviation (specifically, the distance from the center of gravity of vehicle 10 to the nearest point) between center of gravity CG of vehicle 10 and the target trajectory. Δyd1 denotes the speed of vehicle 10 traveling toward the target trajectory. θ denotes the angle (i.e., orientation) of vehicle 10 to a tangent of the target trajectory. yd2r denotes the centrifugal acceleration corresponding to curvature R of the target trajectory.

It is to be noted that transverse deviation Δy is acquired as a physical quantity depending on a method of measuring the position of the own vehicle. For example, transverse deviation Δy is acquired as a transverse deviation on an actual road surface provided with a transverse slope. In short, transverse deviation Δy is acquired as information related to the length along the road surface. Alternatively, transverse deviation Δy is acquired as a transverse deviation on a virtual flat surface assumed to be provided with no transverse slope. In short, transverse deviation Δy is acquired as information related to direct distance.

Figure 3:
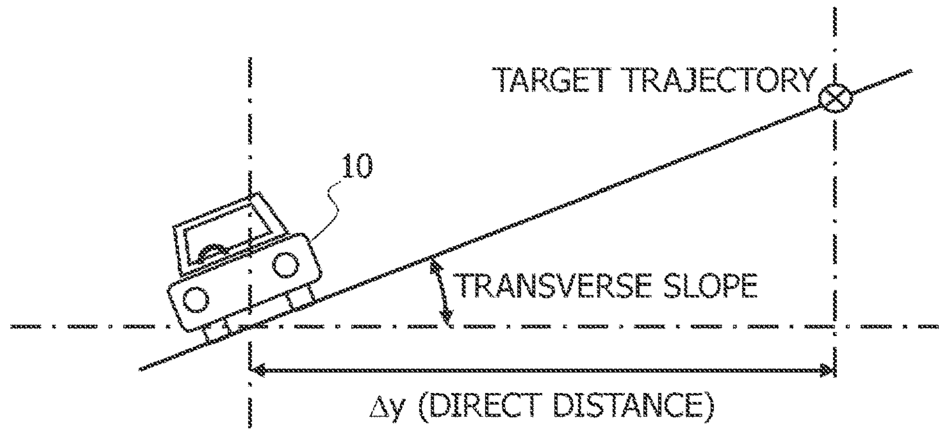
FIG. 3 is a diagram illustrating a transverse deviation as direct distance.
Figure 4:
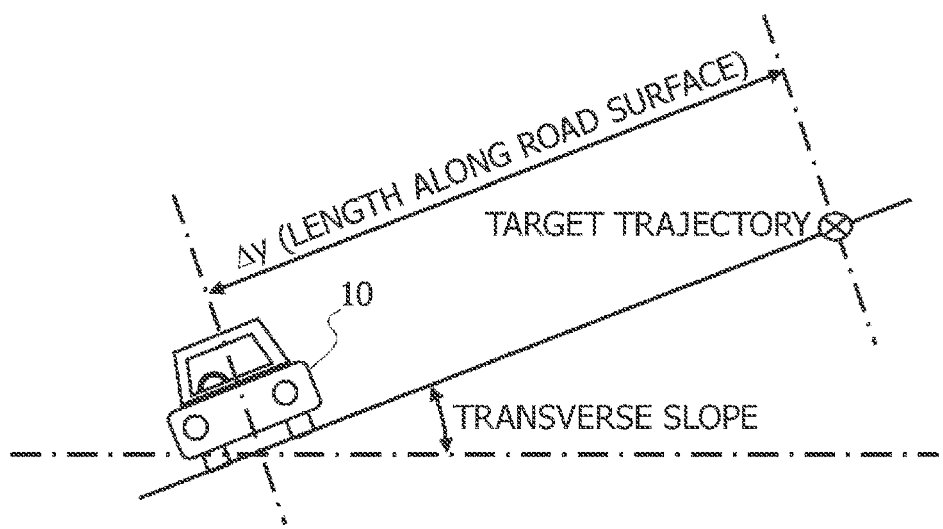
FIG. 4 is a diagram illustrating the transverse deviation as length along a road surface.

FIG. 3 illustrates transverse deviation Δy as information related to direct distance and FIG. 4 illustrates transverse deviation Δy as information related to the length along a road surface.

It is to be noted that the direction in which the diagram is penetrated is the traveling direction of vehicle 10 in each of FIGS. 3 and 4.

For example, when vehicle control system 100 detects the position of the own vehicle by using the GPS receiver of navigation system 320, the position of the own vehicle is detected as GPS coordinates of latitude and longitude. The transverse slope of the road surface is not thus taken into consideration. Transverse deviation Δy is obtained as information related to direct distance as illustrated in FIG. 3.

In contrast, when vehicle control system 100 detects the position of the own vehicle by dead reckoning based on information related to the vehicle motion, the position of the own vehicle is estimated by taking into consideration the influence of the road surface slope. Transverse deviation Δy is thus obtained as information related to the length along the road surface as illustrated in FIG. 4.

Furthermore, when vehicle control system 100 detects the position of the own vehicle on the basis of results of the recognition of the external environment by stereo camera 310, radar 340, omnidirectional camera 350, and the like, the external environment of vehicle actually traveling on the road surface is recognized. Transverse deviation Δy is thus obtained as information related to the length along the road surface as illustrated in FIG. 4.

However, for example, when the information related to the position of the own vehicle obtained on the basis of the results of the recognition of the external environment is corrected in accordance with the transverse slope of the road surface or when the position of the own vehicle is estimated with reference to the map data on the basis of the results of the recognition of the external environment, transverse deviation Δy is obtained as information related to direct distance as illustrated in FIG. 3.

Actuator control section 570 converts lateral acceleration command yd2c acquired from tracking controller 501 to a steering control command and outputs this steering control command to steering control unit 602 of electronic control power steering apparatus 600. The steering control command is a control command for a steering angle or steering torque.

Steering control unit 602 then controls steering actuator 601 on the basis of the acquired steering control command to achieve lateral acceleration command yd2c.

In addition, slope correction value creation section 540, slope correction section 550, and control amount correction value creation section 560 estimate the amount of disturbance that deflects the trajectory of vehicle 10 in the transverse direction by using information related to transverse deviation Δy and correct lateral acceleration command yd2c (or the steering control command) by using the estimated amount of disturbance.

In short, vehicle motion control apparatus 500 has functions of a disturbance estimation section and the tracking controller. The disturbance estimation section estimates the amount of disturbance corresponding to transverse deviation Δy by using the information related to transverse deviation Δy. The tracking controller obtains a control command for causing vehicle 10 to track a target trajectory by using the estimated amount of disturbance.

Here, the disturbance that deflects the trajectory of vehicle 10 in the transverse direction includes the transverse slope of a road, the external force of a crosswind, and vehicle characteristics such as wheel alignment. The external force acts on vehicle 10 to deflect the trajectory of vehicle 10 in the transverse direction. The vehicle characteristics deflect the trajectory of vehicle 10 in the transverse direction.

For example, if a road has any transverse slope, gravity deviates the actual trajectory of vehicle 10 from the target trajectory onto the lower side of the slope and the performance of tracking the target trajectory decreases in some cases.

In addition, when a crosswind blows in the direction orthogonal to the traveling direction of vehicle 10, the wind pressure deviates the actual trajectory of vehicle 10 from the target trajectory in the downwind direction and the performance of tracking the target trajectory decreases in some cases.

Figure 5:
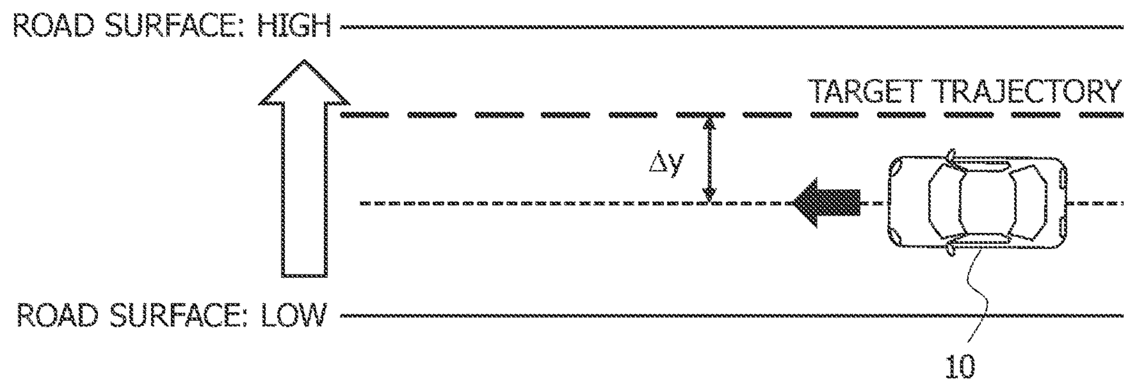
FIG. 5 is a diagram illustrating a state in which the transverse deviation is caused by a transverse slope.

FIG. 5 illustrates a state in which transverse deviation Δy is caused on a road with a transverse slope.

In the case of FIG. 5, the road has a transverse slope of which the right side is higher and left side is lower in the traveling direction of vehicle 10. Gravity thus deviates the trajectory of vehicle 10 to the left side (i.e., the lower side of the slope) from the target trajectory, causing transverse deviation Δy.

If a disturbance such as a transverse slope or wind causes transverse deviation Δy, lateral acceleration command yd2c obtained by tracking controller 501 using Equation 1 is changed to decrease transverse deviation Δy.

Processing of calculating lateral acceleration command yd2c by using Equation 1 is, however, adapted to a reduction in transverse deviation Δy with no disturbance. This causes a delay in convergence with the target trajectory or causes a steady-state deviation in some cases even if steering control is performed in accordance with lateral acceleration command yd2c calculated from Equation 1.

Vehicle motion control apparatus 500 thus estimates the amount of disturbance such as a transverse slope or a crosswind and corrects lateral acceleration command yd2c (or the steering control command) calculated in accordance with Equation 1 on the basis of the estimated amount of disturbance to prevent the disturbance from decreasing the performance of tracking the target trajectory.

It is to be noted that, if a transverse slope alone comes into focus, Equation 1 is a formula for deriving lateral acceleration command yd2c on the assumption that the transverse slope of the road surface on which vehicle 10 is traveling is zero. Vehicle motion control apparatus 500 thus corrects lateral acceleration command yd2c (or the steering control command) to compensate for the difference between the transverse slope of the road surface in the target trajectory and the transverse slope of the road surface in the actual trajectory of vehicle 10.

In vehicle control system 100 illustrated in FIG. 1, vehicle motion control apparatus 500 acquires information related to an estimation value of the transverse slope from ESC unit 700, but the estimation value of the transverse slope is too low in accuracy to be used for control to prevent disturbance from decreasing the tracking performance.

Slope correction value creation section 540 thus obtains a transverse slope correction value ΔLRG by using transverse deviation Δy. Transverse slope correction value ΔLRG is for correcting a transverse slope estimation value LRG1 [deg] estimated by ESC unit 700.

Slope correction section 550 then corrects transverse slope estimation value LRG1 estimated by ESC unit 700 with transverse slope correction value ΔLRG created by slope correction value creation section 540 to obtain a final transverse slope estimation value LRG.

This causes transverse slope estimation value LRG to be a value in which various kinds of disturbance such as a transverse slope, a crosswind, and further vehicle characteristics that deflect vehicle 10 are reflected with high accuracy.

Control amount correction value creation section 560 obtains a control amount correction value on the basis of transverse slope estimation value LRG (i.e., the estimation value of the amount of disturbance). Control amount correction value creation section 560 corrects lateral acceleration command yd2c (or the steering control command based on lateral acceleration command yd2c calculated in accordance with Equation 1) calculated in accordance with Equation 1 by using the obtained control amount correction value.

For example, when vehicle 10 travels on a road with a transverse slope, a component of gravitational force occurs in the direction of the lower side of the transverse slope and vehicle 10 is pulled by this component of force. This causes transverse deviation Δy between the target trajectory and the actual trajectory.

Slope correction value creation section 540 thus obtains transverse slope correction value ΔLRG on the assumption that the lateral acceleration controlled on the basis of transverse deviation Δy and a component of gravitational acceleration counterbalance each other.

If it is assumed that the lateral acceleration controlled on the basis of transverse deviation Δy and the component of gravitational acceleration counterbalance each other, Equation 2 is derived from Equation 1.

$$yd2c = G1 \cdot \Delta y - G2 \cdot V\sin\theta + G3 \cdot \frac{1}{R}V^2 + \text{component of gravitational force} = 0 \quad \text{Equation 2}$$

If angle θ and curvature R are set to zero here on the assumption that transverse deviation Δy is constant, Equation 2 is converted to Equation 3.

$$yd2c = G1 \cdot \Delta y[m] + \text{component of gravitational force} = 0 \quad \text{Equation 3}$$

It is thus possible to obtain transverse slope correction value ΔLRG from Equation 4 if gain G1 is set to 1.

$$\Delta LRG = \sin^{-1}\left(\frac{\Delta y}{9.8}\right) \times \frac{180}{\pi} \quad \text{Equation 4}$$

In short, it is possible to derive transverse slope correction value ΔLRG by using the arcsine of the component [$m/s^2$] of gravitational acceleration and the gravitational acceleration [9.8 $m/s^2$].

For example, if transverse deviation Δy is 0.2 m, transverse slope correction value ΔLRG is expressed as ΔLRG=1.169 [deg] as demonstrated in Equation 5.

$$\Delta LRG = \sin^{-1}\left(\frac{0.2}{9.8}\right) \times \frac{180}{\pi} = 1.169[deg] \quad \text{Equation 5}$$

Slope correction section 550 acquires information related to transverse slope correction value ΔLRG obtained by slope correction value creation section 540 and transverse slope estimation value LRG1 estimated by ESC unit 700. Slope correction section 550 obtains final transverse slope estimation value LRG [deg] in accordance with Equation 6.

$$LRG = LRG1 + \Delta LRG \quad \text{Equation 6}$$

For example, when transverse deviation Δy is zero and it is possible for the actual trajectory of vehicle 10 to track the target trajectory, slope correction value creation section 540 calculates transverse slope correction value ΔLRG as 0 [deg] and slope correction section 550 sets, as final transverse slope estimation value LRG, transverse slope estimation value LRG1 as estimated by ESC unit 700.

In addition, when vehicle 10 is traveling on the lower side of the transverse slope as compared with the target trajectory, slope correction value creation section 540 calculates transverse slope correction value ΔLRG for making a correction to increase transverse slope estimation value LRG1 and slope correction section 550 sets, as final transverse slope estimation value LRG, a result obtained by increasing transverse slope estimation value LRG1 estimated by ESC unit 700 with transverse slope correction value ΔLRG.

In contrast, when vehicle 10 is traveling on the higher side of the transverse slope as compared with the target trajectory, slope correction value creation section 540 calculates transverse slope correction value ΔLRG for making a correction to decrease transverse slope estimation value LRG1.

Slope correction section 550 sets, as final transverse slope estimation value LRG, a result obtained by decreasing transverse slope estimation value LRG1 estimated by ESC unit 700 with transverse slope correction value ΔLRG.

In short, transverse deviation Δy is influenced and caused by an estimation error in transverse slope estimation value LRG1 by ESC unit 700, a crosswind, a variation in the vehicle characteristics, and the like. Transverse slope estimation value LRG serving as a result obtained by correcting transverse slope estimation value LRG1 with transverse slope correction value ΔLRG based on transverse deviation Δy is thus information indicating the amount of disturbance such as a transverse slope or a crosswind with high accuracy.

Control amount correction value creation section 560 acquires information related to transverse slope estimation value LRG from slope correction section 550. Control amount correction value creation section 560 obtains a control amount correction value on the basis of transverse slope estimation value LRG. The control amount correction value is for preventing the transverse slope from causing transverse deviation Δy.

In Equation 1 described above, disturbance such as a transverse slope or a crosswind that deflects vehicle 10 is not taken into consideration. Lateral acceleration command yd2c is calculated to decrease transverse deviation Δy. The occurrence of disturbance thus decreases the performance of tracking a target trajectory.

Control amount correction value creation section 560 thus modifies lateral acceleration command yd2c as a value that expects the amount of disturbance by correcting lateral acceleration command yd2c in accordance with the amount of disturbance (i.e., transverse slope estimation value LRG). Lateral acceleration command yd2c is calculated in accordance with Equation 1.

This processing of correcting lateral acceleration command yd2c in accordance with transverse slope estimation value LRG prevents the performance of tracking a target trajectory from decreasing in spite of any disturbance.

It is to be noted that large transverse deviation Δy is detected in some cases, for example, when vehicle 10 starts to move. If transverse slope correction value ΔLRG is calculated on the basis of transverse deviation Δy, the performance of tracking a target trajectory can decrease.

When transverse deviation Δy is greater than an upper limit, slope correction value creation section 540 thus uses transverse slope estimation value LRG1 as it is to perform the processing of correcting lateral acceleration command yd2c by setting transverse slope correction value ΔLRG to zero.

Here, the upper limit is set as a value that is exceeded by transverse deviation Δy, for example, only when vehicle 10 starts to move.

In short, vehicle motion control apparatus 500 does not estimate the amount of disturbance by using information related to transverse deviation Δy when transverse deviation Δy is out of a predetermined range.

In addition, when vehicle 10 is traveling by using no target trajectory, slope correction value creation section 540 and slope correction section 550 stop correcting transverse slope estimation value LRG1.

Furthermore, the transverse slope of a road does not steeply change because of the road structure. Slope correction value creation section 540 or slope correction section 550 thus gradually changes transverse slope correction value ΔLRG or final transverse slope estimation value LRG and eventually limits the change speed of lateral acceleration command yd2c within a predetermined range even when transverse deviation Δy steeply changes.

Figure 6:
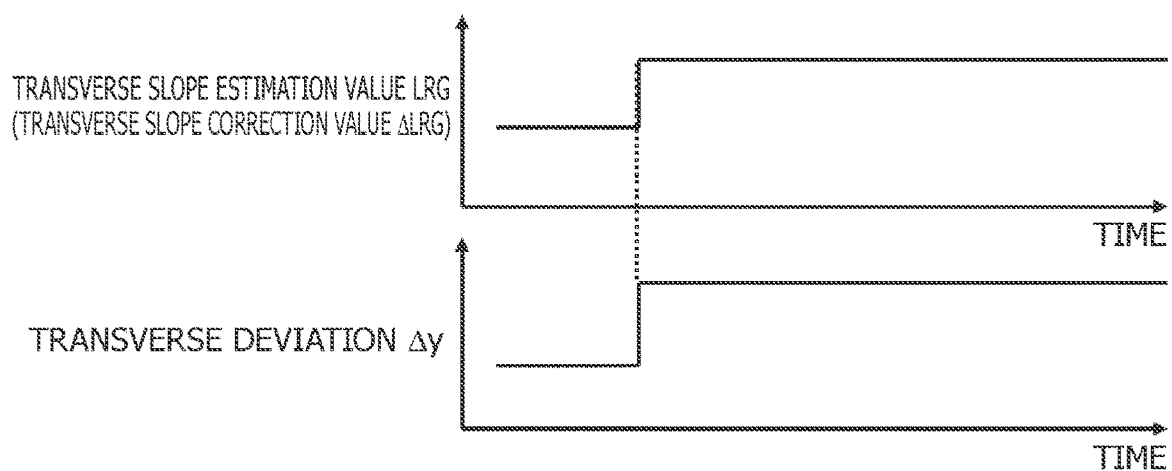
FIG. 6 is a time chart exemplifying changes in the transverse deviation and a transverse slope estimation value without limiting the change in the transverse slope estimation value.
Figure 7:
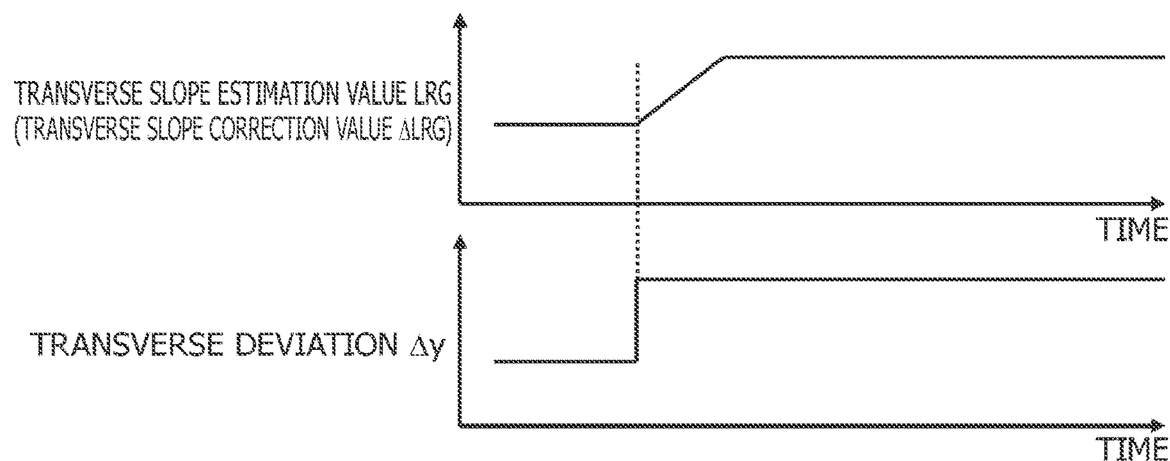
FIG. 7 is a time chart exemplifying the changes in the transverse deviation and the transverse slope estimation value with the change in the transverse slope estimation value limited.

Each of FIGS. 6 and 7 is a diagram illustrating a change in transverse slope estimation value LRG (or transverse slope correction value ΔLRG) that responds to a steep change in transverse deviation Δy. FIG. 6 illustrates a case in which the steep change in transverse deviation Δy is reflected in final transverse slope estimation value LRG as it is. FIG. 7 illustrates a case in which final transverse slope estimation value LRG gradually follows a steep change in transverse deviation Δy.

In the case of FIG. 6, final transverse slope estimation value LRG also changes steeply in response to the steep change in transverse deviation Δy. In contrast, in the case of FIG. 7, the amount of change per calculation cycle of transverse slope estimation value LRG or transverse slope correction value ΔLRG is limited on the basis of the upper limit. This causes final transverse slope estimation value LRG to gradually change even if transverse deviation Δy steeply changes.

If final transverse slope estimation value LRG is gradually changed in this way in spite of the steep change in transverse deviation Δy, lateral acceleration command yd2c is prevented from steeply changing along with the steep change in transverse deviation Δy and it is possible to prevent the steering angle from steeply changing and achieve smooth vehicle motion.

In addition, when tracking controller 501 performs the model predictive control as described above, it is possible for slope correction value creation section 540 to calculate transverse slope correction value ΔLRG from the difference between the predictive value and the actual value of transverse deviation Δy. In other words, it is possible for slope correction value creation section 540 to calculate transverse slope correction value ΔLRG from the difference between the predictive value at a point in the past and the current actual value.

For example, when tracking controller 501 estimates a transverse deviation $\Delta y_{z\text{-}50}$ in 500 ms, slope correction value creation section 540 calculates transverse slope correction value ΔLRG on the basis of the difference (i.e., prediction error) between transverse deviation $\Delta y_{z\text{-}50}$ that is the predictive value 500 ms ago and transverse deviation Δy that is the actual value at the current point as demonstrated in Equation 7.

$$\Delta LRG = \sin^{-1}\left(\frac{\Delta y_{z-50} - \Delta y}{9.8}\right) \times \frac{180}{\pi} \quad \text{Equation 7}$$

When vehicle motion control apparatus 500 obtains transverse slope correction value ΔLRG in accordance with Equation 7, vehicle motion control apparatus 500 corrects transverse slope estimation value LRG1 that is an actual value on the basis of the difference between transverse deviation $\Delta y_{z\text{-}50}$ that is a predictive value and transverse deviation Δy that is an actual value and estimates the amount of disturbance.

Vehicle motion control apparatus 500 acquires information related to transverse slope estimation value LRG1 estimated by ESC unit 700 in vehicle control system 100 illustrated in FIG. 1, but an external electronic control device that estimates the transverse slope is not limited to ESC unit 700.

For example, when vehicle 10 includes an active suspension, it is possible for vehicle motion control apparatus 500 to acquire information related to a transverse slope estimated by an electronic control device of the active suspension on the basis of an output of detection by a G sensor (acceleration sensor) and correct the acquired transverse slope estimation value on the basis of transverse deviation Δy.

The active suspension is an apparatus that controls the motion of vehicle 10 by applying hydraulic force to a suspension. This active suspension includes an acceleration sensor that detects vibration or oscillation typically caused in response to the irregularities of a road surface or the traveling state of vehicle 10.

The electronic control device of the active suspension is then capable of estimating the transverse slope from an output of detection by the acceleration sensor.

In addition, in an image processing device of stereo camera 310 or autonomous driving control apparatus 400 that acquires an image of stereo camera 310, it is possible to adopt a system in which vehicle motion control apparatus 500 acquires information related to the transverse slope obtained from the image of stereo camera 310.

Furthermore, vehicle motion control apparatus 500 is capable of directly obtaining information related to transverse slope estimation value LRG used for tracking control from information related to transverse deviation Δy instead of acquiring the information related to transverse slope estimation value LRG used for tracking control by correcting information related to transverse slope estimation value LRG1 acquired from the outside on the basis of transverse deviation Δy.

FIG. 8 is a block diagram illustrating a second embodiment of vehicle control system 100. Vehicle motion control apparatus 500 illustrated here in FIG. 8 directly calculates information related to transverse slope estimation value LRG used for tracking control from information related to transverse deviation Δy.

Vehicle motion control apparatus 500 in FIG. 8 includes a slope estimation section 580 in place of slope correction value creation section 540 and slope correction section 550 in vehicle motion control apparatus 500 in FIG. 1.

Slope estimation section 580 acquires information related to transverse deviation Δy and outputs information related to transverse slope estimation value LRG.

Specifically, slope estimation section 580 sets, as transverse slope estimation value LRG, information related to an angle as calculated in accordance with Equation 4 or Equation 7 and outputs transverse slope estimation value LRG to control amount correction value creation section 560.

Control amount correction value creation section 560 then obtains a correction value on the basis of transverse slope estimation value LRG acquired from slope estimation section 580. The correction value is for correcting lateral acceleration command yd2c in accordance with a disturbance that deflects vehicle 10.

In vehicle control system 100 in FIG. 8, it is also possible to set lateral acceleration command yd2c that anticipates the amount of disturbance including a transverse slope. It is possible to prevent the disturbance from decreasing the performance of tracking a target trajectory.

In addition, it is unnecessary in vehicle control system 100 in FIG. 8 for vehicle motion control apparatus 500 to acquire information related to transverse slope estimation value LRG1 from the outside. Furthermore, it is unnecessary for vehicle motion control apparatus 500 to perform processing of correcting the transverse slope estimation value, making it possible to simplify a configuration and processing of vehicle motion control apparatus 500.

Vehicle motion control apparatus 500 can be equipped with a function of estimating a transverse slope from vehicle motion information such as the lateral acceleration, the yaw rate, or the vehicle speed of vehicle 10 and further a function of correcting a transverse slope estimation value on the basis of transverse deviation Δy.

FIG. 9 is a block diagram illustrating a third embodiment of vehicle control system 100.

Vehicle motion control apparatus 500 illustrated in FIG. 9 obtains a transverse slope estimation value LRG2 from the lateral acceleration, the yaw rate, and the vehicle speed. In addition, vehicle motion control apparatus 500 obtains transverse slope correction value ΔLRG on the basis of information related to transverse deviation Δy. Vehicle motion control apparatus 500 then performs tracking control on the basis of transverse slope estimation value LRG obtained by correcting transverse slope estimation value LRG2 with transverse slope correction value ΔLRG.

Vehicle motion control apparatus 500 in FIG. 9 is additionally provided with a slope estimation section 590 in comparison with vehicle motion control apparatus 500 in FIG. 1. Slope estimation section 590 estimates a transverse slope on the basis of information related to the vehicle motion state acquired from vehicle state detection apparatus 200.

Figure 10:
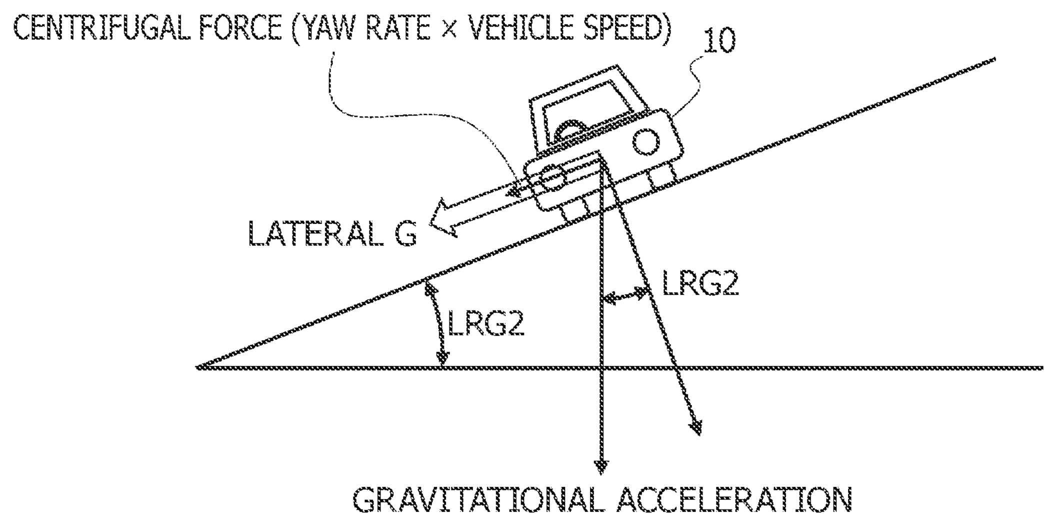
FIG. 10 is a diagram for describing processing of estimating the transverse slope on the basis of a yaw rate, vehicle speed, and lateral acceleration.

FIG. 10 is a diagram for describing processing of calculating transverse slope estimation value LRG2 on the basis of information related to the vehicle motion state, specifically the yaw rate, the vehicle speed, and the lateral acceleration, in slope estimation section 590.

Slope estimation section 590 first obtains centrifugal force applied to vehicle 10 on the basis of a detection value of the yaw rate and a detection value of the vehicle speed.

$$\text{centrifugal force} = \text{yaw rate} \times \text{vehicle speed}$$

Next, slope estimation section 590 obtains force applied to vehicle 10 in the lateral direction on the basis of a result of the calculation of the centrifugal force and a detection value of the lateral acceleration.

$$\text{force } G \text{ applied in lateral direction} = \text{lateral acceleration} - \text{centrifugal force}$$

Slope estimation section 590 then obtains transverse slope estimation value LRG2 on the basis of a result of the calculation of the force applied in the lateral direction.

$$\text{transverse slope estimation value } LRG2 = \sin^{-1}(\text{force applied in lateral direction})$$

In addition, slope correction value creation section 540 obtains transverse slope correction value ΔLRG on the basis of transverse deviation Δy in accordance with Equation 4 or Equation 7 as with slope correction value creation section 540 of vehicle control system 100 illustrated in FIG. 1.

Slope correction section 550 acquires transverse slope estimation value LRG2 obtained by slope estimation section 590 and transverse slope correction value ΔLRG obtained by slope correction value creation section 540. Slope correction section 550 sets a result obtained by correcting transverse slope estimation value LRG2 with transverse slope correction value ΔLRG as final transverse slope estimation value LRG.

In short, vehicle motion control apparatus 500 illustrated in FIG. 9 estimates the amount of disturbance that deflects vehicle 10 by using information related to the lateral acceleration of vehicle 10, information related to the yaw rate of vehicle 10, and information related to the vehicle speed of vehicle 10 along with information related to transverse deviation Δy.

In vehicle control system 100 in FIG. 9, it is also possible to set lateral acceleration command yd2c that anticipates the amount of disturbance including a transverse slope. It is possible to prevent the disturbance from decreasing the performance of tracking a target trajectory.

Vehicle motion control apparatus 500 (specifically, actuator control section 570) can be equipped with a control function of changing braking force command allocation to the left and the right (i.e., the difference in braking force between the left and the right) in the braking apparatus as control for causing the actual trajectory of vehicle 10 to track a target trajectory along with a function of controlling steering by electronic control power steering apparatus 600.

Figure 11:
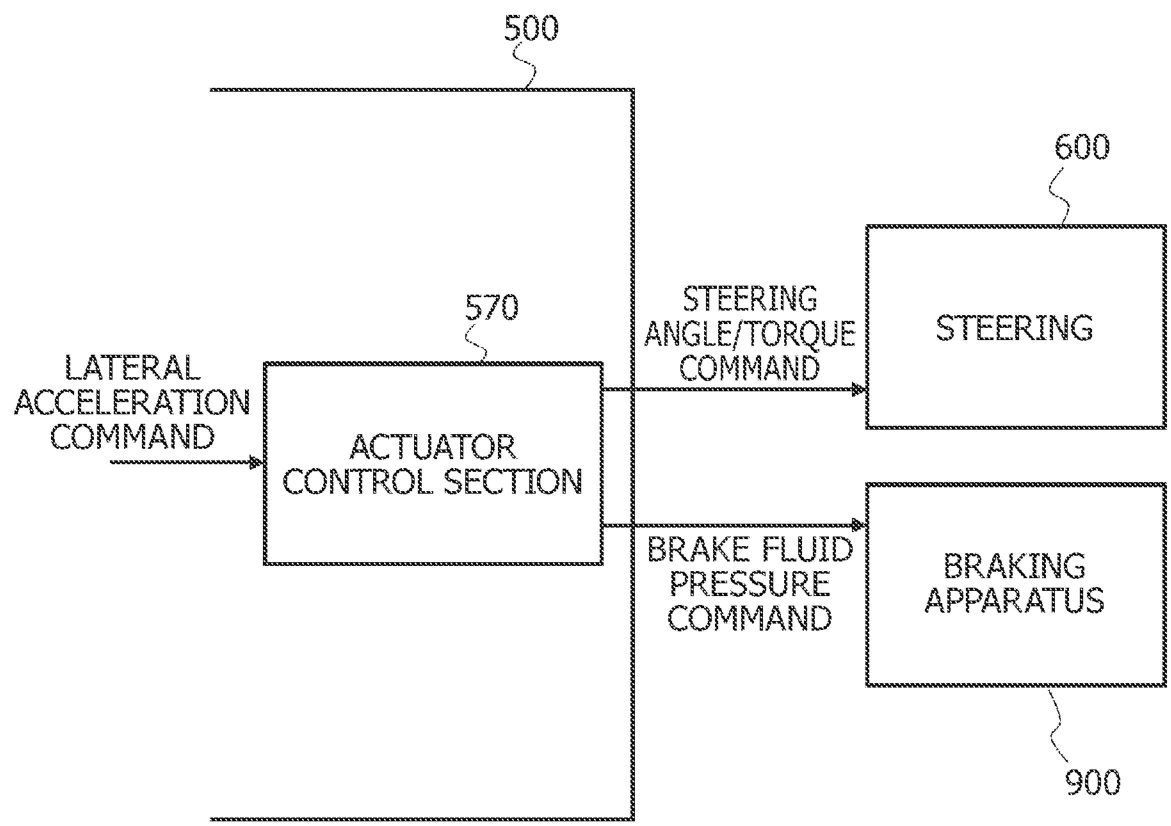
FIG. 11 is a block diagram illustrating a system that performs steering control and braking force control for a lateral acceleration command.

FIG. 11 is a block diagram illustrating vehicle control system 100 in which vehicle motion control apparatus 500 is equipped with a steering control function and a braking control function.

Actuator control section 570 illustrated in FIG. 11 controls steering by electronic control power steering apparatus 600 that is a steering apparatus and braking force by a braking apparatus 900 to cause the actual trajectory of vehicle 10 to track a target trajectory.

Braking apparatus 900 is a braking apparatus capable of individually adjusting the braking forces of the respective wheels of vehicle 10. For example, braking apparatus 900 is a hydraulic braking apparatus capable of individually adjusting the pressures of brake fluids supplied to the respective wheels.

Actuator control section 570 then converts lateral acceleration command yd2c to a steering control command and a brake fluid pressure command (specifically, a command for the allocation of the pressures of brake fluids to the left and the right), outputs the steering control command to electronic control power steering apparatus 600, and outputs the brake fluid pressure command to braking apparatus 900. The steering control command is a command for a steering angle or steering torque.

In short, it is possible for vehicle motion control apparatus 500 to achieve lateral acceleration command yd2c by controlling at least one of the steering by electronic control power steering apparatus 600 and the braking force by braking apparatus 900.

For example, it is possible for vehicle motion control apparatus 500 to make a minor modification on the deviation between a target trajectory and the actual trajectory by chiefly controlling the steering by electronic control power steering apparatus 600 to cause the actual trajectory of vehicle 10 to track the target trajectory and changing the difference in braking force between the left and the right.

In addition, actuator control section 570 of vehicle motion control apparatus 500 is equipped with a function of controlling the difference in driving force between the left and right wheels by the driving apparatus of vehicle 10 along with a function of controlling the steering by electronic control power steering apparatus 600.

It is then possible for actuator control section 570 to achieve lateral acceleration command yd2c by controlling at least one of the steering by electronic control power steering apparatus 600 and the driving force by the driving apparatus.

Furthermore, it is possible for actuator control section 570 of vehicle motion control apparatus 500 to achieve lateral acceleration command yd2c by controlling the steering by electronic control power steering apparatus 600, the braking force by braking apparatus 900, and the driving force by the driving apparatus.

In short, it is possible for actuator control section 570 of vehicle motion control apparatus 500 to achieve lateral acceleration command yd2c by controlling at least one of the steering apparatus and the braking and driving apparatuses of vehicle 10.

It is possible to appropriately use each of the technical ideas described in the embodiments in combination as long as conflict is avoided.

In addition, the contents of the present invention have been specifically described with reference to the preferred embodiments, but it will be obvious to those skilled in the art that a variety of modifications are adoptable on the basis of the fundamental technical ideas and the teachings of the present invention.

For example, it is possible to adopt a system in which one control apparatus creates a target trajectory of vehicle 10 and creates a control command for causing the actual trajectory of vehicle 10 to track the target trajectory.

In addition, the processing of calculating lateral acceleration command yd2c in vehicle motion control apparatus 500 is not limited to the processing that uses the model predictive control. It is possible to adopt processing that does not use the model predictive control.

In addition, it is possible to adopt, for example, the transverse deviation at a forward gazing point as transverse deviation $\Delta y$ or adopt the distance from vehicle 10 to a target trajectory in the transverse direction of vehicle 10 as transverse deviation $\Delta y$. The identification of transverse deviation $\Delta y$ illustrated in FIG. 2 is not limiting.

REFERENCE SYMBOL LIST

10 vehicle
100 vehicle control system
200 vehicle state detection apparatus
300 external environment recognition apparatus
400 autonomous driving control apparatus (first control apparatus)
500 vehicle motion control apparatus (second control apparatus, vehicle control apparatus)
600 electronic control power steering apparatus (steering apparatus)
602 steering control unit (actuator control device)
700 ESC unit

The invention claimed is:

1. A vehicle control apparatus comprising:

a transverse direction difference acquisition section which acquires information related to a positional difference in a transverse direction between a target trajectory of a vehicle and an actual trajectory of the vehicle;

a disturbance estimation section which estimates an amount of disturbance which corresponds to the positional difference in the transverse direction based on the information related to the positional difference in the transverse direction acquired by the transverse direction difference acquisition section; and a tracking controller which obtains a control command based on the amount of disturbance estimated by the disturbance estimation section, the control command being for causing the vehicle to track the target trajectory, wherein the disturbance estimation section estimates the amount of disturbance based on information related to a past positional difference in the transverse direction and information related to a current positional difference in the transverse direction.

2. The vehicle control apparatus according to claim 1, wherein the information related to the past positional difference in the transverse direction is a predictive value and the information related to the current positional difference in the transverse direction is an actual value, and the disturbance estimation section estimates the amount of disturbance according to a result obtained by changing the actual value based on a difference between the predictive value and the actual value.

3. A vehicle control apparatus comprising:

a transverse direction difference acquisition section which acquires information related to a positional difference in a transverse direction between a target trajectory of a vehicle and an actual trajectory of the vehicle;

a disturbance estimation section which estimates an amount of disturbance which corresponds to the positional difference in the transverse direction based on the information related to the positional difference in the transverse direction acquired by the transverse direction difference acquisition section; and a tracking controller which obtains a control command based on the amount of disturbance estimated by the disturbance estimation section, the control command being for causing the vehicle to track the target trajectory, wherein the tracking controller obtains a command for controlling lateral acceleration of the vehicle to decrease the positional difference in the transverse direction, the command serving as the control command, and the tracking controller obtains the command for controlling the lateral acceleration to compensate for a difference between a transverse slope of a road surface in the target trajectory and a transverse slope of a road surface in the actual trajectory.

4. The vehicle control apparatus according to claim 3, wherein the tracking controller limits change in speed of the command for controlling the lateral acceleration within a predetermined range.

5. The vehicle control apparatus according to claim 3, wherein the tracking controller makes the command for controlling the lateral acceleration smaller when the transverse slope of the road surface in the actual trajectory has a higher position than a position of the transverse slope of the road surface in the target trajectory than when the transverse slope of the road surface in the actual trajectory has a lower position than the position of the transverse slope of the road surface in the target trajectory.

6. The vehicle control apparatus according to claim 3, wherein the tracking controller obtains the command for controlling the lateral acceleration based on at least one of information related to an orientation of the vehicle and information related to curvature of the target trajectory along with the information related to the positional difference in the transverse direction.

7. A vehicle control method comprising:

a step of acquiring information related to a positional difference in a transverse direction between a target trajectory of a vehicle and an actual trajectory of the vehicle;

a step of estimating an amount of disturbance which corresponds to the positional difference in the transverse direction based on the acquired information related to the positional difference in the transverse direction; and a step of obtaining a control command based on the estimated amount of disturbance, the control command being for causing the vehicle to track the target trajectory, wherein the step of estimating the amount of disturbance estimates the amount of disturbance based on information related to a past positional difference in the transverse direction and information related to a current positional difference in the transverse direction.

8. A vehicle control method comprising:

a step of acquiring information related to a positional difference in a transverse direction between a target trajectory of a vehicle and an actual trajectory of the vehicle;

a step of estimating an amount of disturbance which corresponds to the positional difference in the transverse direction based on the acquired information related to the positional difference in the transverse direction; and a step of obtaining a control command based on the estimated amount of disturbance, the control command being for causing the vehicle to track the target trajectory, wherein the step of obtaining the control command obtains a command for controlling lateral acceleration of the vehicle to decrease the positional difference in the transverse direction, the command serving as the control command, and obtains the command for controlling the lateral acceleration to compensate for a difference between a transverse slope of a road surface in the target trajectory and a transverse slope of a road surface in the actual trajectory.

* * * * *